United States Patent
Anga

(10) Patent No.: US 9,338,951 B2
(45) Date of Patent: May 17, 2016

(54) HANGING POT WATER INDICATOR

(71) Applicant: John Anga, Toronto (CA)

(72) Inventor: John Anga, Toronto (CA)

(*) Notice: Subject to any disclaimer, the term of this patent is extended or adjusted under 35 U.S.C. 154(b) by 145 days.

(21) Appl. No.: 13/998,038

(22) Filed: Sep. 25, 2013

(65) Prior Publication Data

US 2014/0076422 A1 Mar. 20, 2014

Related U.S. Application Data

(63) Continuation-in-part of application No. 13/573,381, filed on Sep. 13, 2012, now Pat. No. 8,973,518.

(51) Int. Cl.
| | |
|---|---|
| *A01G 27/00* | (2006.01) |
| *A01G 25/16* | (2006.01) |
| *A47G 7/04* | (2006.01) |
| *G01G 3/02* | (2006.01) |
| *A01G 9/02* | (2006.01) |

(52) U.S. Cl.
CPC ............ *A01G 27/008* (2013.01); *A01G 27/003* (2013.01); *A01G 9/024* (2013.01); *Y10T 137/7349* (2015.04)

(58) Field of Classification Search
CPC ... A01K 27/00; A01K 27/003; A01K 27/008; A47G 7/04; A47G 7/044; A47G 7/047; F16K 21/18; G01G 3/02; G01G 3/04; G01G 23/20
USPC ................... 46/67; 73/73; 116/215, DIG. 32; 137/78.3, 403, 406; 177/232, 233, 234; 248/318, 333, 339; D6/556, 557, 558; D11/148
See application file for complete search history.

(56) References Cited

U.S. PATENT DOCUMENTS

| | | | | |
|---|---|---|---|---|
| 202,807 | A * | 4/1878 | Forschner | 177/232 |
| 225,020 | A * | 3/1880 | Pettengill | 248/318 |
| 479,718 | A * | 7/1892 | Morgan et al. | 177/232 |
| 1,017,137 | A * | 2/1912 | Chatillon | 177/232 |
| 1,063,242 | A * | 6/1913 | Catucci | 177/169 |
| 2,464,665 | A * | 3/1949 | Anderson | 446/227 |
| 3,085,364 | A * | 4/1963 | Chapin | 47/48.5 |
| 3,168,797 | A * | 2/1965 | Patassy | 47/79 |
| 3,293,799 | A * | 12/1966 | Keller et al. | 47/79 |
| 3,900,134 | A * | 8/1975 | Larson | 222/52 |
| 4,060,934 | A * | 12/1977 | Skaggs | 47/79 |
| 4,078,625 | A * | 3/1978 | Loeb | 177/233 |
| 4,102,308 | A * | 7/1978 | Kilham | 119/52.3 |
| 4,117,630 | A * | 10/1978 | Kalas | 47/67 |
| 4,216,619 | A * | 8/1980 | Espy | 47/67 |
| 4,454,831 | A * | 6/1984 | Gallo | 116/200 |
| 4,760,666 | A * | 8/1988 | Han | 47/79 |
| 5,315,784 | A * | 5/1994 | Henehan | 47/67 |
| 5,848,494 | A * | 12/1998 | Spelt | 47/67 |
| 6,161,329 | A * | 12/2000 | Spelt | 47/67 |
| 6,230,436 | B1 * | 5/2001 | Givens | 47/29.5 |

(Continued)

FOREIGN PATENT DOCUMENTS

FR 1428959 A * 2/1966 ............... G01G 3/02

*Primary Examiner* — R. A. Smith

(57) ABSTRACT

A hanging pot water indicator having a hollow tubular spring housing, a cap on the upper end of the tubular housing, a hollow tubular sliding sleeve telescopically slidable, an opening in the cap, a coiled extension spring within the tubular housing and the sleeve, an upper wire extension portion extending from the upper end of the spring passing through the opening in the cap, and defining an upper hook, and a lower wire extension on the lower end of the spring, extending from the sleeve and formed to define a lower hook.

10 Claims, 7 Drawing Sheets

(56) References Cited

U.S. PATENT DOCUMENTS

| | | | |
|---|---|---|---|
| 6,564,509 B1 * | 5/2003 | Zahner | 47/67 |
| 6,845,588 B2 * | 1/2005 | Muxlow | 47/67 |
| 7,129,426 B1 * | 10/2006 | Wang | 177/173 |
| 7,219,468 B1 * | 5/2007 | Muxlow | 47/67 |
| 7,611,116 B2 * | 11/2009 | Santa Cruz et al. | 248/328 |
| D703,070 S * | 4/2014 | Anga | D10/56 |
| 8,973,518 B2 * | 3/2015 | Anga | 116/215 |

* cited by examiner

HANGING POT WATER INDICATOR

FIELD OF THE INVENTION

This application is a Continuation In Part of U.S. application Ser. No. 13/573,381, Title: Hanging Pot Water Indicator; Inventor: John Anga; Filed Sep. 13, 2012, the priority of which is claimed. The Invention relates to a plant care device for indicating the water status of a hanging potted plant.

BACKGROUND OF THE INVENTION

The care of hanging potted plants requires regular watering in appropriate amounts. Plants that are left to dry will die. Plants that receive excessive water will also die. Where a potted plant is placed at ground level or waist level, then it is possible for a knowledgeable person to regulate the watering of individual pots. However, in many cases persons will wish to hang the pots at or above head level typically on the porch of a house or the balcony of an apartment or such locations. When this happens, the care person, no matter how knowledgeable will have great difficulty in determining the water status of a pot. Feeling the earth in the pot with a hand is not always possible, and is uncertain as to its reliability. Watering such pots at regular schedules is also not acceptable. Some plants require more water and others less.

Accordingly it is desirable to provide a visual plant care device by means of which an owner or plant care person can visually determine the water status of a particular pot, and replenish water or not, as the case may be. In the past, devices have been proposed which attempt to measure the water content of the soil. However these devices are relatively expensive, and may not always be reliable. In addition, if such a device is embedded in the soil in a pot, which is hanging at a considerable height, it is not possible to see the reading of the device.

Accordingly, there is a need for a much simpler system for determining the water status of a potted plant, visually, from a distance.

In addition it is desirable that such a device shall be relatively inexpensive, and can be reused over and over again, and does not require any sophisticated technology.

Preferably one device will be used with each pot, and left in position throughout the life of the plant. Preferably the device will be adapted to a range of pots weighing different amounts.

BRIEF SUMMARY OF THE INVENTION

With a view to providing a plant care device indicating the water status of a potted plant, the invention provides a hanging pot water indicator having a hollow tubular spring housing, typically made of thermo plastic, a dust protector on the upper end of the tubular housing, located around the upper end of the tubular housing, a hollow tubular sliding sleeve, telescopically slidable relative to the tubular housing, an opening in the dust protector, a coiled extension spring within the tubular housing, an upper wire extension portion extending from the upper end of the spring passing through the opening in the dust protector, and defining an upper hook, and a lower wire extension of the spring extending from the lower end of the sleeve, and formed to define a hook. Preferably the invention provides retention means located between the collar on the dust protector and the upper end of the tubular spring housing retaining the upper end of the spring, and engagement means at the lower end of the sleeve, engaging the lower end of the spring.

Preferably, the dust protector will be formed with a mushroom shape to shed dust.

In one embodiment, the lower end of the spring will be formed with an outwardly flared spiral portion.

Preferably there will be some visible indicia formed on the tubular spring housing.

In another embodiment, the indicator may be adapted to operate a remote indication of the water status of each plant pot in the system.

In one embodiment the device may be provided with several springs with different capacity, the springs being interchangeable in the device, to suit the needs of customers.

In one embodiment, the spring is of regular cylindrical shape to render it easier for the user to change from one spring to another, and the lower hook is offset.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

DESCRIPTION OF A SPECIFIC EMBODIMENT

The invention is illustrated in the form of a hanging pot water indicator (10). Such a hanging pot water indicator (10) has utility in suspending a flower pot above the ground, usually at an elevation where the interior of the flower pot is not visible or accessible to a plant care person. Typically there will be one indicator per pot and it will be left in place for the life of the plant.

Figure 2:
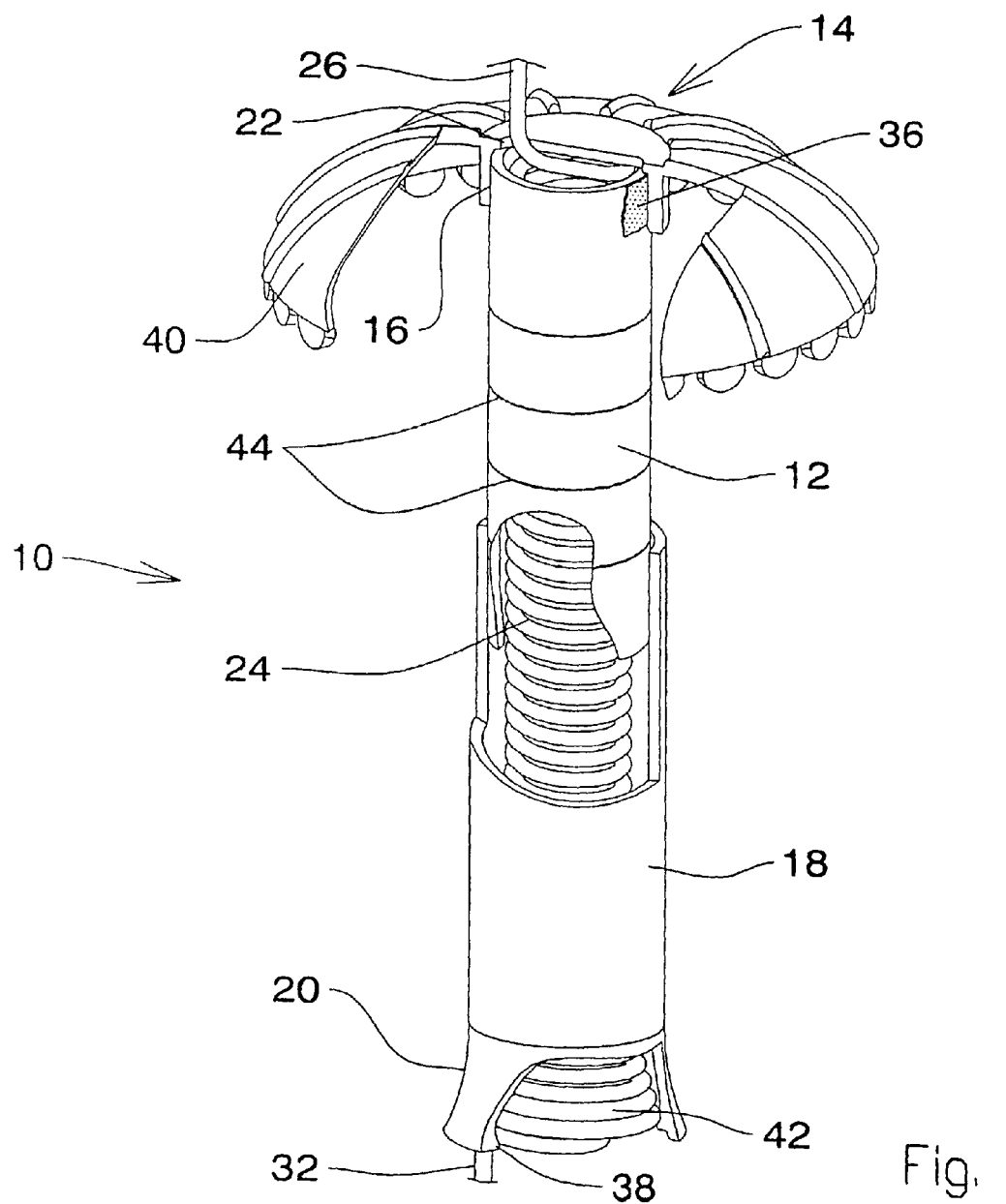
FIG. 2 is a greatly enlarged perspective illustration partly exploded and cut away, of the hanging pot water indicator of FIG. 1.

The hanging pot water indicator (10) has a hollow tubular spring housing (12), typically made of thermo plastic, and a dust protector (14) secured directly on and closing the upper end of the tubular housing as shown in FIG. 2. The dust protector is formed with an integral one piece fastening collar (16) bonded to the upper end of the tubular housing (12).

The hanger further comprises a hollow tubular sliding sleeve (18), which (in this embodiment) has an interior diameter greater than the exterior diameter of the tubular housing (12), and being telescopically slidable in respect thereof. Sleeve (18) has a lower trumpet portion (20) on the lower end of the sleeve.

There is an opening (22) in the cap or dust protector (14).

A coiled extension spring (24) is located within the tubular housing (12) and the sleeve (18). The spring (24) has an upper wire extension portion (26) extending from the upper end of the spring (24) passing through the opening (22) in the dust protector (14) and defining an upper hook (30). A lower wire extension (32) extends from the lower end of the spring (24), and is formed to define a lower hook (34) and extends from a sleeve (18).

Retention means (36) such as adhesive, are located between the collar (16) on the dust protector (14) and the upper end of the tubular spring housing (12) retaining the spring housing upper end in the collar (16).

Engagement means or tab (38) is located at the lower end of the trumpet portion (20) of the sleeve (18), such as a tab, to engage the lower end of the spring (24).

The dust protector (14) is formed with an umbrella or mushroom shaped shell (40) which assists in identifying movement between the housing (12) and the sleeve (18). The lower end of the spring is formed with an outwardly flared spiral portion (42) (in this embodiment), received in trumpet portion (20) of sleeve (18).

Visible indicia (44) are formed on the tubular spring housing (12), in this embodiment. In use, the upper hook (30) of the hanging pot water indicator is first of all attached to a hanger at an elevation. The plant pot is then attached to the lower hook (34) of the hanging pot water indicator.

The tab (38) engages the lower end of the spring (24). As the spring (24) is extended by the weight of the pot, it will draw the sleeve (18) down.

Assuming that the watering status of the plant at that time is adequate, then it will cause extension of the spring (24) and the sleeve (18) relative to the housing (12). As the water content of the pot dries out, and its weight is reduced, the pot will gradually be drawn upwardly by the spring. The spiral flared portion (42) of the spring (24) engages the trumpet portion (20) of the sleeve (18) and forces it upwardly.

Visual observation of the position of the sleeve (18) relative to the housing (12) (and indicia (44)) will give adequate indication of the water status of that plant in that pot, and then water can be added, or the pot can be left unattended according to the observations made.

While the above noted and described hanging pot water indicator will perform satisfactorily in domestic or even office environments where a few hanging plants are provided for decoration, it will be appreciated that the invention is of wider application in the field of commercial horticultural establishments such as commercial greenhouses and flower growing farms.

In these cases, large numbers of hanging flower pots will be either growing, or available in inventory, for example in a retail establishment. In these cases, it will be desirable to provide for automatic watering of the plants as and when required.

Figure 1:
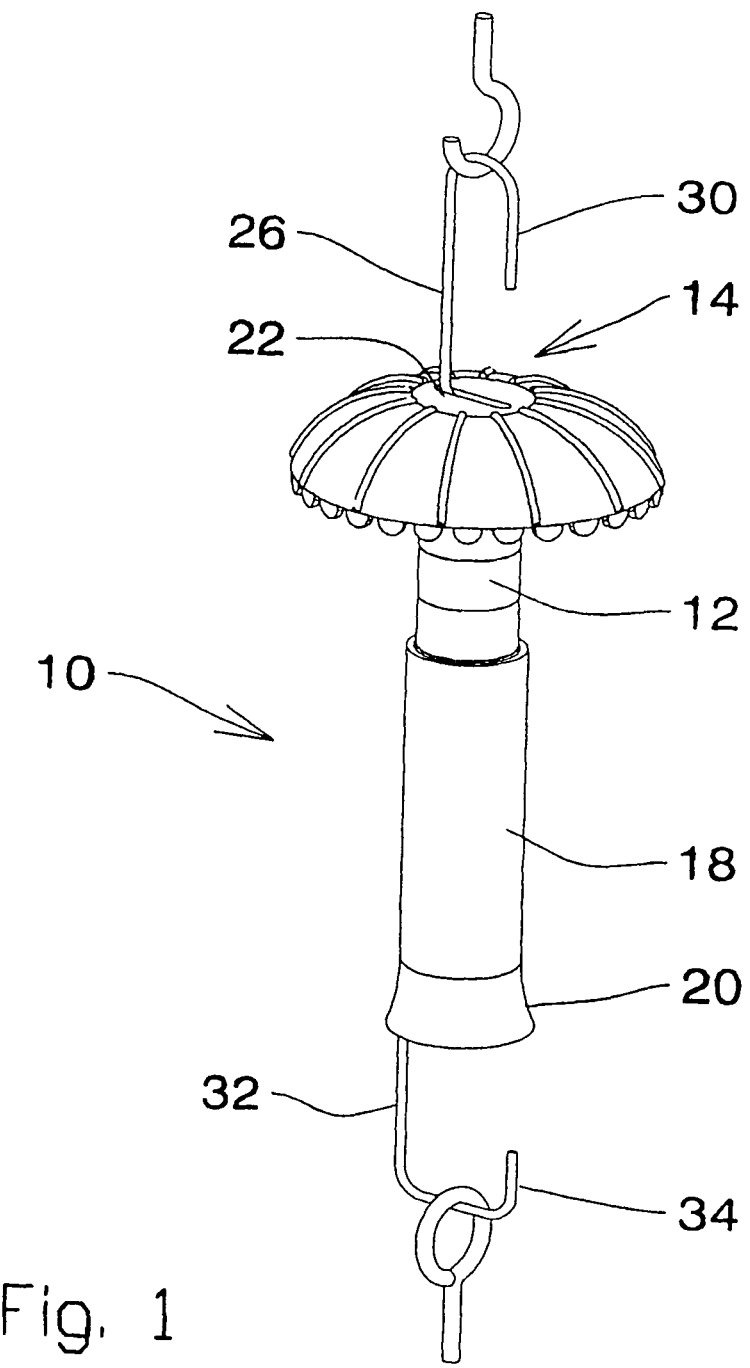
FIG. 1 is a general perspective illustration showing a hanging pot water indicator illustrating the invention, hanging from a fixed location and supporting a potted plant.
Figure 3:
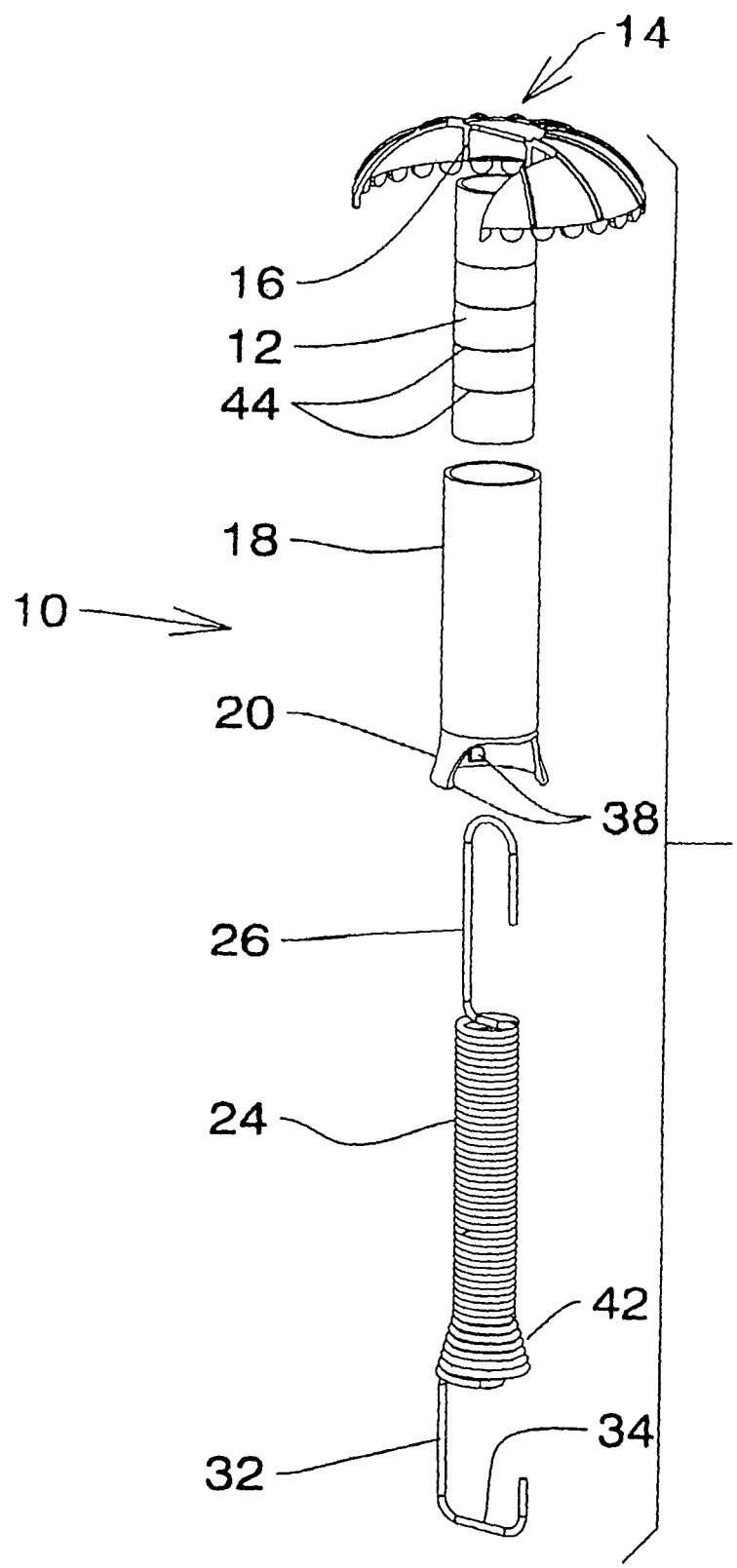
FIG. 3 is an exploded view of the hanging pot water indicator of FIGS. 1 and 2, partially cut away.
Figure 4:
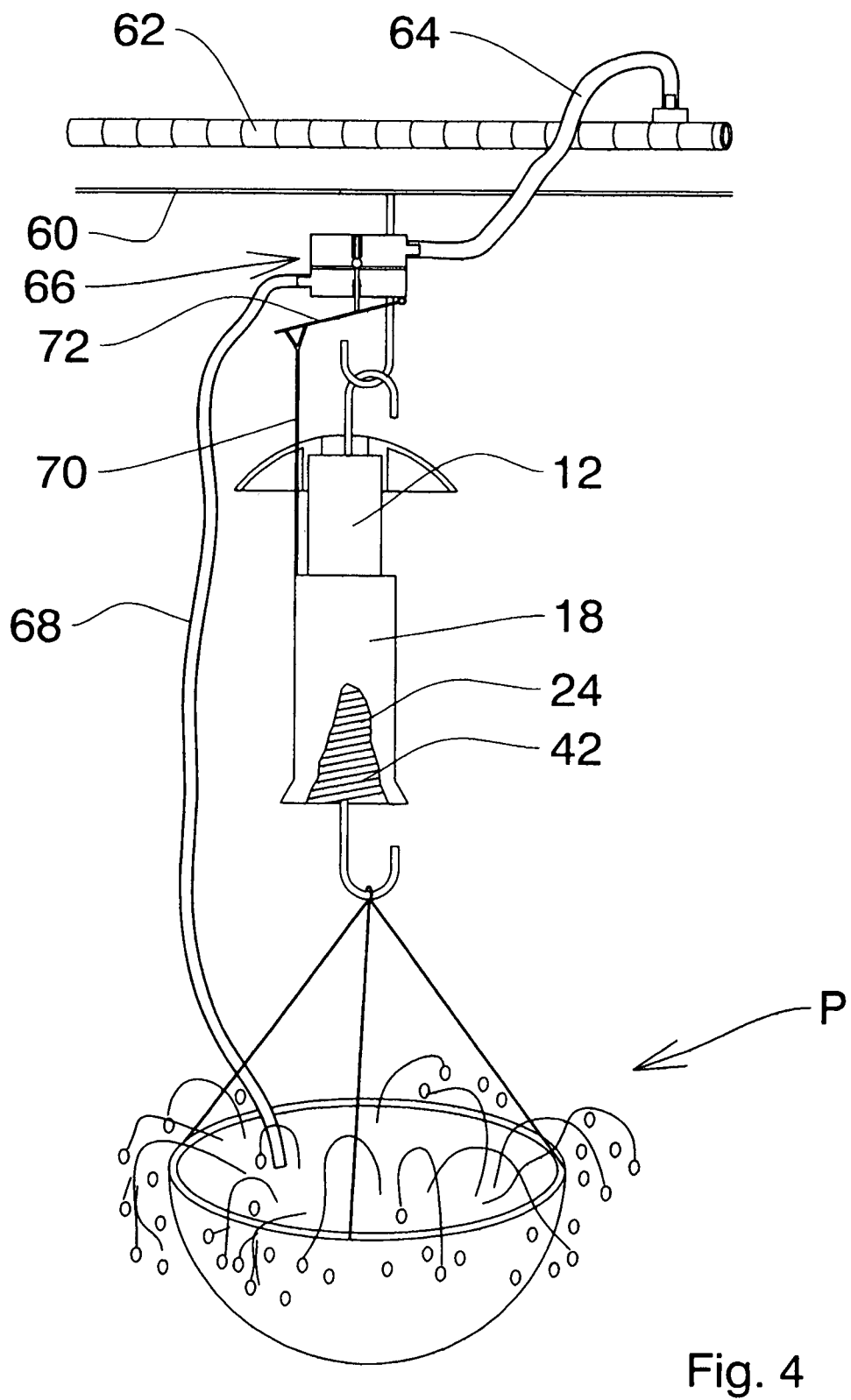
FIG. 4 is a schematic side view of an alternate embodiment.
Figure 5:
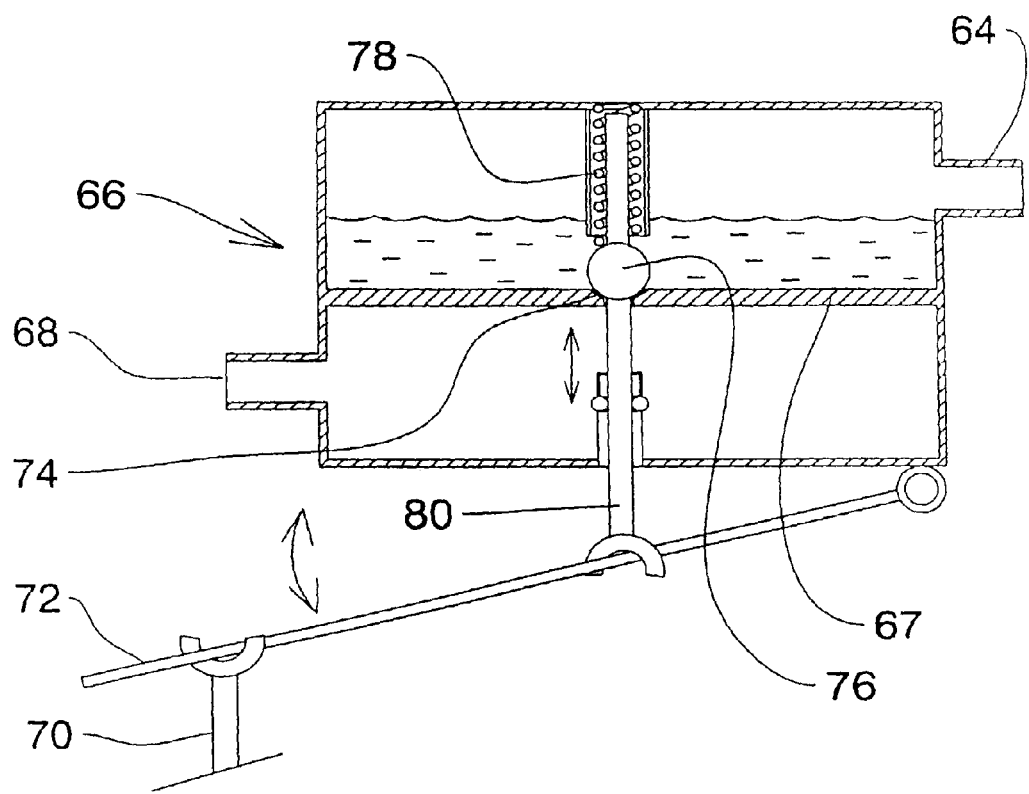
FIG. 5 is a sectional view of a portion of FIG. 4.

This can be accommodated by means of the further embodiment as shown in FIGS. 4 and 5. In this case, a flower pot (P), is illustrated hanging from a hanging pot water indicator of the type generally similar to that described in FIGS. 1 to 3. In other words it will have an upper tubular spring housing (12) and a dust collector (14) formed with an integral collar (16) on the upper end of tubular housing (12) and a hollow sliding sleeve (18) and a spring (24). These will function in the same way as described above. That is to say that when the water in the particular pot (P) is adequate, the hanging pot water indicator (10) will be somewhat extended. When the water in the pot (P) becomes insufficient then the hanging pot water indicator will be retracted upwardly.

In this embodiment however, water will be supplied automatically, when the hanging pot water indicator contracts. In this case it is assumed that numerous such pots (P) will be suspended from a rail (60) typically in a greenhouse or commercial establishment or for example, in a retail establishment. A transverse water supply pipe (62) is connected by means of a supply hose (64) to a valve (66). From the valve (66) water will be allowed to trickle down pipe (68) into the pot (P).

In this case, the hanging pot water indicator has an operating rod (70) attached to the sleeve (18) (FIG. 4). The valve (66) has a lever arm (72) which is connected to the operating rod (70). A separator (67) divides chamber (66) into the upper and lower chamber portions. The water supply pipe (64) connects with the upper portion. A valve seat (74), in separator (67) has a closure ball (76), having an internal spring (78) mounted on a valve rod (80). The rod (80) connects with the arm (72)

In this embodiment, the water supply (64) supplies water to the upper portion of the chamber (66). The ball (76) normally closes seat (74), thus preventing passage of the water downwardly into the lower chamber portion. However when the lever arm (72) pushes the rod (80) upwardly against the spring (78), the ball (76) will lift off its seat, and water will thus flow downwardly from the upper chamber portion to the lower chamber portion of valve (66) and thereby flow outwardly to the outlet pipe (68) down into the pot. When sufficient water has flowed into the pot to cause hanging pot water indicator to become extended once again, the operating rod (70) will be moved and the ball (76) will then once again seat thereby preventing further flow of water.

It will be seen that all of this takes place in a simple and economical structure. In particular it is noteworthy that once set up in this way with the hanging pot water indicator adjusted to allow the correct amount of water, water will be supplied automatically to the various pots as needed, individually. All of this will happen with each hanging pot being controlled and supplied with water at its own rate, and without reference to the other hanging water pots where plants of other species may require more or less water or more or less frequent supplies of water.

Figures 6, 7:
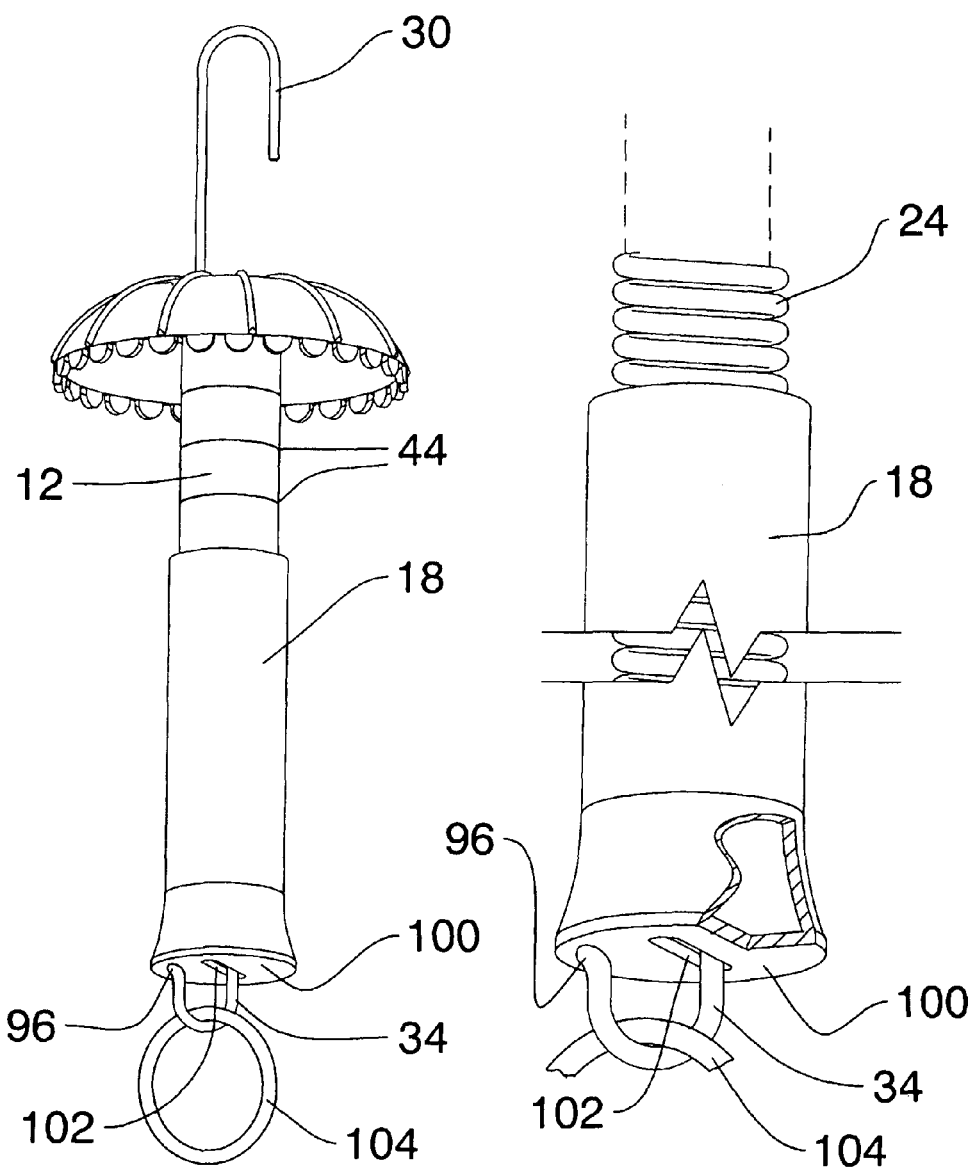
FIG. 6 is a perspective illustration of a further embodiment.
FIG. 7 is an enlarged cut-a-way view of the lower end of the embodiment of FIG. 6.

In accordance with a further embodiment of the invention, FIGS. 6, and 7 a spring (16) is provided which is of cylindrical shape from top to bottom. At the upper end a hook (30) is defined by an upward spring extension, and at the lower end, a lower hook (34) is defined by a lower extension of the spring. The lower hook (34) is formed with an offset portion (96), for purposes to be described below.

One reason for providing the generally cylindrical shape spring is simply for the sake of the economy. For further and more material reasons, it enables the complete product to be sold with several springs of varying different tension. Clearly, a pot containing flowers may be small, medium or large in size, and correspondingly small medium or large in mass. It is impractical to provide a single spring which will accommodate such a wide range of pots.

Accordingly the product may be sold with, for example, three different springs. This will enable a user to select the appropriate spring for the size of pot. Changing of the spring in the product can proceed in a relatively simple manner as described below.

In order to accommodate a simple cylindrically shaped spring, the invention provides a tubular sliding sleeve (18), having a closed lower end (100). The closed lower end (100) is provided with a transverse slot (102). The slot has a predetermined length. It will be seen that the lower hook (34) of the spring extends through the slot (102). The hook (34) in this embodiment has a predetermined diameter which is less than the length of the slot (102). In this way it is possible for the hook (34) to be inserted and removed through the slot, when it is desired to change springs. It will also be noted that the offset portion (96) of the lower hook (34) captures the hook in the slot (102), so that it cannot be retracted in normal use. This will ensure that when the hanging pot indicator is in use, and when, for example, a plant pot has been removed from the lower hook (34), the entire sleeve (18) will be retracted up, without drawing the lower hook (34) up through the slot (102).

However, if a purchaser wishes to interchange one spring for another, then it is a comparatively simple matter for the purchaser to take the lower hook (34) either with finger and thumb or with pliers, and manipulate it up through the slot (102). The spring can then be removed, and replaced with a new spring of greater or lesser capacity. To facilitate the manipulation of the hook, the hook (34) is relatively of small diameter, to enable it to be fitted in or out of the slot. A key ring (104) is releasably attached to the hook to enable a plant pot to be suspended from it.

It will be appreciated that while what is described is a spring housing of a first diameter and a sleeve of a second greater diameter, telescopically slideable, that the invention may possibly use a housing of one diameter and a sleeve of a lesser diameter, telescopically sliding within the housing.

It will also be appreciated that the dust cap, while being shown as a mushroom shaped design, which is aesthetically pleasing to customers, and assists in reading the displacement of the sleeve, it could be less complex and simply be an upper closure on the spring housing.

Figure 8:
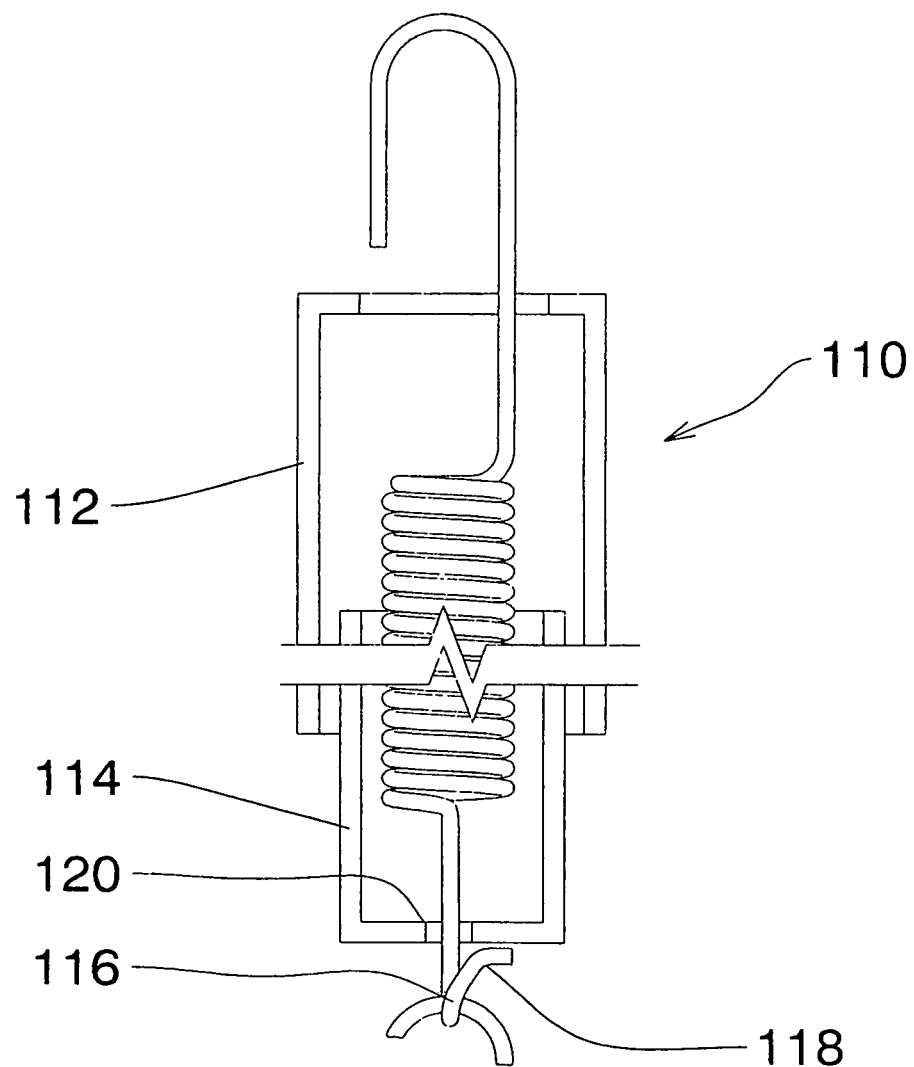
FIG. 8 is a schematic illustration of a further embodiment.

FIG. 8 illustrates a device (110) having a spring housing (112) of a first diameter, and a sliding sleeve (114) of a second lesser diameter, telescopically sliding within the housing (112).

This illustration shows a simple upper end on the spring housing (112).

These variations may be deemed to be less appealing to customers, but may still have a place in the market.

A hook (116) having an offset (118) extending down through slot (120).

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A hanging pot water indicator comprising;
    a hollow tubular spring housing having an upper end and a lower end;
    a cap on the upper end of the tubular housing;
    a hollow tubular sliding sleeve, being telescopically slideable relative to the lower end of the housing;
    a closure on the lower end of the sleeve;
    a transverse slot in said closure;
    an opening in the cap;
    an extension spring within the tubular housing and the sleeve, having an upper end and a lower end;
    an upper wire extension portion extending from the upper end of the spring passing through the opening in the cap, and defining an upper attachment,
    a lower wire extension on the lower end of the spring, extending through said transverse slot in said closure of the sleeve and having a predetermined length,
    a lower attachment hook formed on said lower wire extension; said hook having a predetermined diameter, less than said length of said slot;
    an offset bend formed in said hook and adapted to engage said closure of said sliding sleeve; and,
    a spring engagement device on the lower end of the sleeve.

2. The hanging pot water indicator as claimed in claim 1 and including a collar on the cap secured at the upper end of the tubular spring housing and retention means located between the spring housing upper end in the collar.

3. The hanging pot water indicator as claimed in claim 2, including a flared lower end portion on the spring and a trumpet portion on the sleeve.

4. The hanging pot water indicator as claimed in claim 3, including engagement means on said trumpet portion engaging said spring.

5. The hanging pot water indicator as claimed in claim 1 and including a control valve for connecting to a water supply and for controlling water flow, an operating rod on said housing operating said control valve, and a hose on said valve supplying water to said pot.

6. The hanging pot water indicator as claimed in claim 1 and wherein said spring is of generally cylindrical shape along its length.

7. The hanging pot water indicator as claimed in claim 1 wherein said spring housing has a first diameter and wherein said sleeve has a second diameter greater than that of said housing.

8. The hanging pot water indicator as claimed in claim 1 wherein said spring housing has a pre-determined first diameter and said sliding sleeve has a second diameter less than that of said housing.

9. The hanging pot water indicator as claimed in claim 1 wherein the cap defines a generally mushroom shaped shell.

10. The hanging pot water indicator as claimed in claim 1 including a suspension ring on said hook, said ring being releasable from said hook for replacement of said spring.

* * * * *